June 26, 1962 E. ALIZON ET AL 3,041,528

MAGNETIC AMPLIFIER DEVICE HAVING ADAPTED COMPENSATION

Filed Dec. 6, 1957 3 Sheets-Sheet 1

INVENTORS
ETIENNE ALIZON
CLAUDE MONIN
BY Paul M. Craig, Jr.
ATTORNEY

MAGNETIC AMPLIFIER DEVICE HAVING ADAPTED COMPENSATION

Filed Dec. 6, 1957 3 Sheets-Sheet 2

INVENTORS
ETIENNE ALIZON
CLAUDE MONIN
BY Paul M. Craig, Jr.
ATTORNEY

MAGNETIC AMPLIFIER DEVICE HAVING ADAPTED COMPENSATION

Filed Dec. 6, 1957 3 Sheets-Sheet 3

INVENTORS
ETIENNE ALIZON
CLAUDE MONIN
BY Paul M. Craig, Jr.
ATTORNEY 3,041,528

MAGNETIC AMPLIFIER DEVICE HAVING ADAPTED COMPENSATION

Etienne Alizon, Le Chesnay, and Claude Monin, Villennes-sur-Seine, France, assignors to Compagnie Industrielle des Telephones, Paris, France, French corporation Filed Dec. 6, 1957, Ser. No. 701,184
Claims priority, application France Dec. 21, 1956
9 Claims. (Cl. 323—89)

The present invention relates to magnetic amplifier devices of the kind employing self-saturated magnetic amplifiers.

An object of the present invention is to provide a magnetic amplifier device, the operation conditions of which remain completely unchanged when the parameters which determine the operation of this magnetic amplifier vary, for example in the case of temperature variation, feed voltage variation or control voltage variation. Accordingly the invention provides a magnetic amplifier device having adapted compensation, wherein there are provided at least two magnetic amplifiers, the first of which performs the function of a pilot or control amplifier, while the second is subject to the regulation of the first, the first magnetic amplifier effecting an automatic polarisation or biasing of the second magnetic amplifier, and wherein the output circuit of the pilot amplifier through which direct current flows, comprises in series, an inductance and a feedback winding wound on the magnetic circuit of said pilot amplifier, and the output of this feedback winding is connected to a polarising winding wound on the magnetic circuit of the regulated amplifier.

In order that the invention may be more clearly understood and readily carried into effect, two embodiments thereof will now be described with reference to the accompanying drawings, in which.

Figure 1:
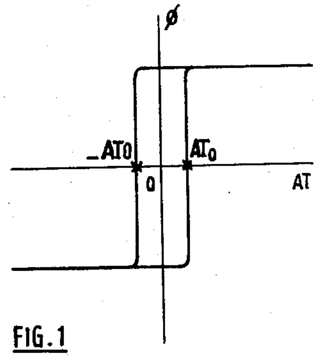
FIGURES 1, 2, 3, 4, 6 and 8 are curves illustrating the operation of the magnetic amplifiers.
Figure 3:
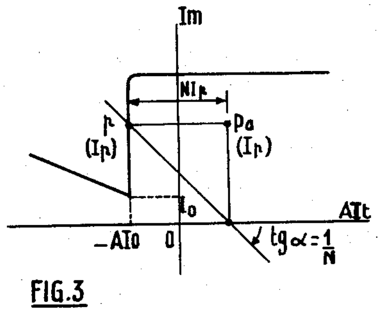
Figure 4:
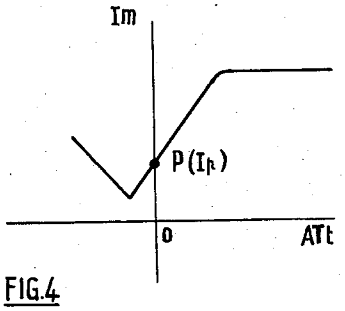

By way of explanation it is pointed out that a self-saturated magnetic amplifier which is controlled by direct current has a characteristic curve of rectangular form such as that indicated in FIGURE 1 showing magnetic flux as a function of ampere-turns. Such a magnetic amplifier also possesses a characteristic curve $I_m(AT_t)$ of the form illustrated in FIGURE 2, giving the mean current $I_m$ in the circuit of the utilisation winding as a function of the continuous ampere-turns $AT_t$ applied to the magnetic circuit. If a "negative feedback" winding, fed by the current supplied to the utilisation circuit of the magnetic amplifier is introduced, and if N is the number of turns of this winding, then a new characteristic curve $I_m(AT_t)$ with negative feedback is deduced from the characteristic curve $I_m(AT_t)$ without negative feedback as indicated in FIGURE 3. The characteristic curve of FIGURE 4 is thus obtained.

Figure 5:
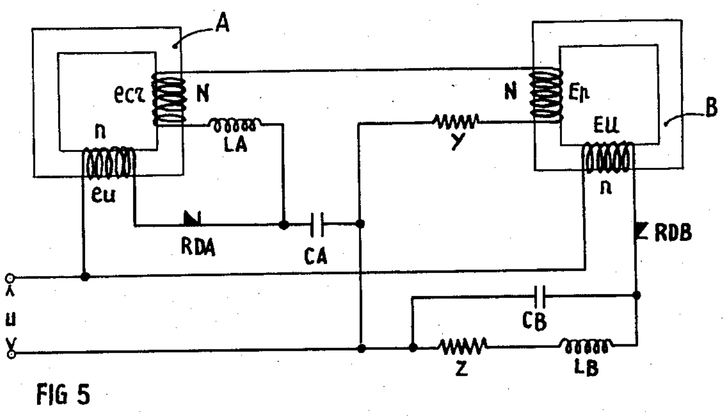
FIGURE 5 illustrates diagrammatically one embodiment of the invention employing two amplifiers.

Referring to the first embodiment of the invention, the device illustrated in FIGURE 5 comprises two magnetic amplifiers A and B, the magnetic circuits of which are identical. These magnetic amplifiers are disposed together in a thermostatically controlled enclosure, and include utilisation windings $e_u$ for A, and $E_u$ for B, which are identical and are fed by the same alternating-current source *u*. RDA and RDB are rectifiers disposed in series with the winding $e_u$ and the winding $E_u$ respectively.

In order that direct current may flow in the utilisation circuit of the amplifier A, the circuit includes a filtering and regulating device consisting of an inductance $L_A$ and a condenser $C_A$. A filtering and regulating device consisting of an inductance $L_B$ and a condenser $C_B$ in the utilisation circuit of the amplifier B is optional. Impedances Y and Z are inserted, one as an adusting impedance in the utilisation circuit of the amplifier A and the other in the utilisation circuit of the amplifier B.

The amplifier A further includes a negative feedback winding $e_{cr}$ having N turns connected to the inductance $L_A$, and the amplifier B includes a polarising or biasing winding $E_p$ having N turns, the latter winding being fed by the current of the utilisation circuit of the amplifier A.

Figure 2:
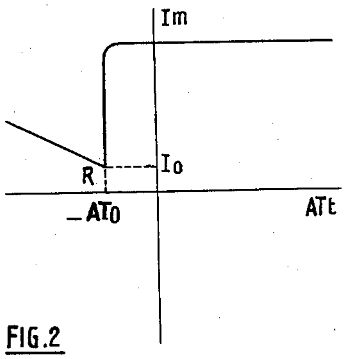

The characteristic curve $I_m(AT_t)$ of the amplifier B has the form indicated in FIGURE 2, and, if the amplifier A had no negative feedback winding it would have a similar characteristic curve. However, by reason of the negative feedback, the characteristic curve of the amplifier A has the form shown in FIGURE 4. Hence, there being no polarisation applied to the amplifier A, if $I_{mA}$ is the current supplied into the utilisation circuit of the amplifier A and $I_p$ the current in the polarising winding of the amplifier B, then $I_{mA}=I_p$ and the point of operation of the device A of FIGURE 5 is represented in FIGURE 4 by the point P.

Figure 6:
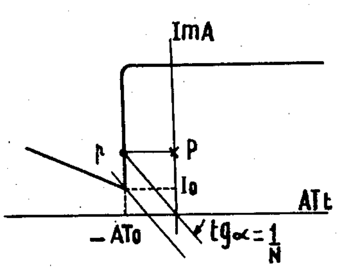

FIGURE 6 shows how the point of operation P of the amplifier A, having negative feedback, is deduced from the point *p* of the characteristic curve $I_{mA}(AT_t)$ without negative feedback. In the figure:

$AT_o$ represents the ampere-turns corresponding to half the width of the hysteresis loop.

$pP=AT_o$, or by construction $pP=NI_{mA}=NI_p$, whence:

$$I_p=\frac{AT_o}{N}$$

It follows that the current in the polarising winding $E_p$ of the amplifier B is such that the polarisation of this amplifier will be, in absolute value, $$N\frac{AT_o}{N}=AT_o$$

Figure 8:
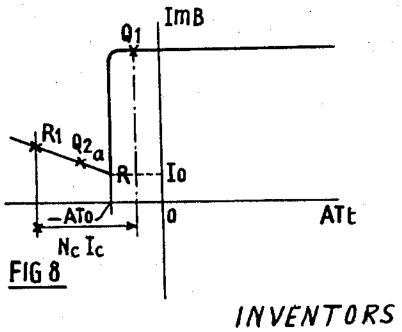

If the direction of the winding $E_p$ is appropriately chosen, this polarisation will be equal to $-AT_o$ in algebraic value, as is indicated in FIGURE 8. An automatic biasing or polarisation of the amplifier B is thus effected, so that the current which it supplies is its minimum current $I_{oB}$, commonly called the residual current. If for any reason, such as temperature variation or variation of the alternating voltage, etc., the characteristic curve $I_{mB}(AT_t)$ shifts in such manner that the vertical portion of this curve remains parallel to itself and the polarisation of the magnetic amplifier B will be automatically modified, so that the inoperative point will always be at the point at which the current supply $I_{mB}$ is minimum.

Figure 7:
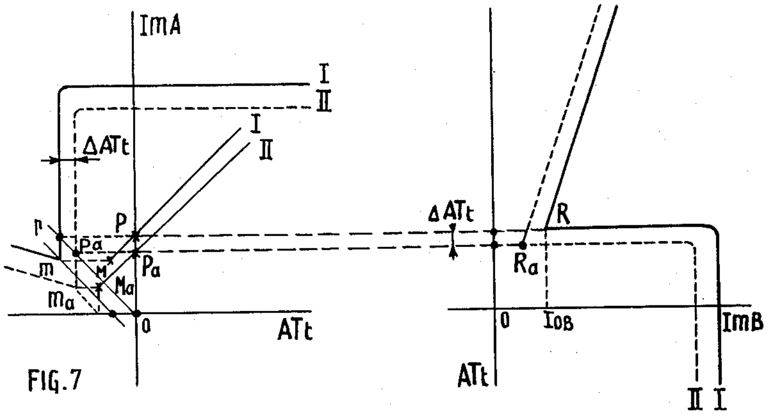
FIGURE 7 is a diagram illustrating the operation of the arrangement according to FIGURE 5.

As is shown by FIGURE 7, the characteristic curve $I_{mA}(AT_t)$, having no negative feedback, has shifted by the quantity $\Delta AT_t$, in the same manner as the characteristic curve $I_{mB}(AT_t)$, since the two amplifiers are subject to the same temperature and feed conditions. The new current $I_{pa}$ supplied by the amplifier A is such that:

$$I_{pa}=\frac{AT_o}{N}-\Delta\frac{AT_t}{N}$$

The polarisation of the amplifier B then becomes:

$$N\left[-\frac{AT_o}{N}+\Delta\frac{AT_t}{N}\right]=-AT_o+\Delta AT_t$$

The new point of operation of the amplifier B is therefore the point $R_a$.

In the foregoing, it has been assumed that the amplifier B has its inoperation point at the minimum current supplied, namely R. However, it may be desired that the inoperative point should be fixed by an additional polarisation at $R_1$, as shown in FIGURE 8.

If ampere-turns $N_cI_c$ are then applied to an amplifier such as B by a control winding $E_c$ of resistance R fed by a direct voltage $U_c$, the point of operation of the amplifier B will move from $R_1$ to $Q_1$ as shown in FIGURE 8. If, under these conditions, the control voltage $U_c$ varies, and becomes for example equal to $U_c-\Delta U_c$, the control ampere-turns become $$N\frac{U_c-\Delta U_c}{R}$$

The new point of operation $Q_{1a}$ may be situated to the left of the point R, for example at $Q_{2a}$ in FIGURE 8, and the operation of the magnetic amplifier is modified, i.e., the control voltage $U_c-\Delta U_c$ is incapable of shifting operation past the biasing value $-AT_0$ and the output current $I_{mB}$ cannot shift from $R_1$ to $Q_1$.

Figure 9:
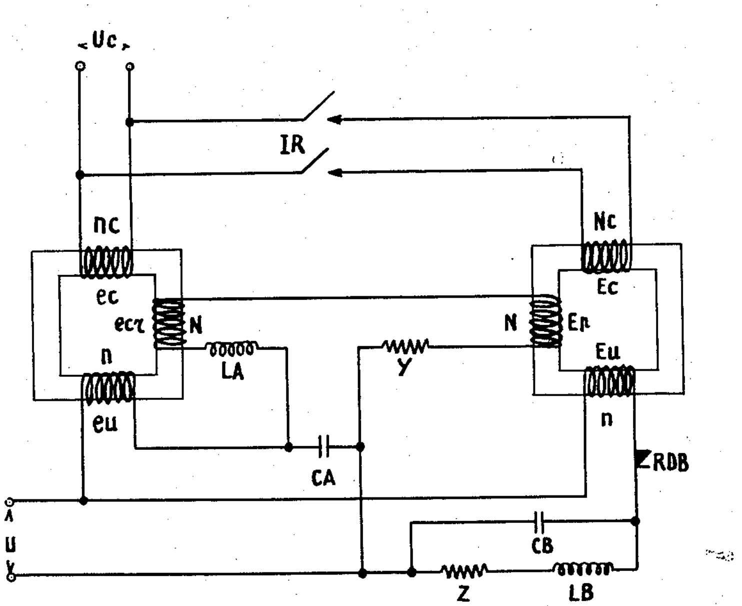
FIGURE 9 illustrates diagrammatically a further embodiment of the invention.

The embodiment of the device as illustrated in FIGURE 9 obviates this disadvantage. There has been provided on the amplifier A, a polarising winding $e_c$ having $n_c$ turns of resistance $r_c$. This winding is continuously supplied with a voltage $U_c$, while the control winding $E_c$ of the amplifier B is supplied with this voltage only at the desired instant, this being effected by any appropriate device. (In FIGURE 9, this device is diagrammatically represented by a switch IR.)

Figure 10:
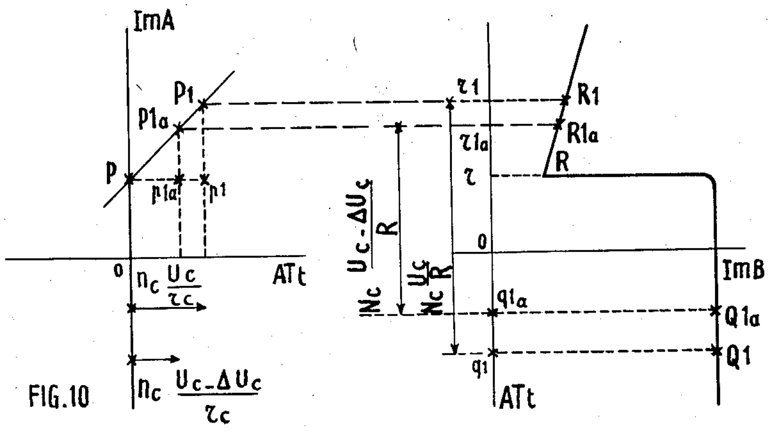
FIGURE 10 is a diagram illustrating the operation of the arrangement according to FIGURE 9.

As is shown by FIGURE 10, the current $I_{mA}$ supplied by the amplifier A is represented by the point $P_1$, from which is deduced the inoperative point $R_1$ of the amplifier B. If the control voltage $U_c$ varies, taking the value $U_c-\Delta U_c$, the ampere-turns of the winding $e_c$ become $$n_c\frac{U_c-\Delta U_c}{r_c}$$

The point of operation $P_1$ of the amplifier A moves to $P_{1a}$ and, under these conditions, the inoperative point $R_1$ of the amplifier B moves to $R_{1a}$.

When the new control voltage $U_c-\Delta U_c$ is applied to the control winding $E_c$ of the amplifier B, the point of operation of this amplifier moves to $Q_{1a}$. It is then possible to write, with reference to FIGURE 10:

$$rr_1=\frac{P_{p1}}{N}=\frac{n_ci_c}{N}=\frac{n_cU_c}{Nr_c}=kU_c$$

Similarly $$rr_{1a}=\frac{P_{1a}p_{1a}}{N}=k(U_c-\Delta U_c)$$

whence $$\frac{rr_{1a}}{rr_1}=\frac{U_c-\Delta U_c}{U_c}$$

and $$rq_1=r_1q_1-r_1r=N_c\frac{U_c}{R}-kU_c=(k_1-k)U_c$$

$$rq_{1a}=r_{1a}q_{1a}-r_{1a}r=(k_1-k)(U_c-\Delta U_c)$$

finally $$\frac{rq_{1a}}{rq_1}=\frac{rr_{1a}}{rr_1}=\frac{U_c-\Delta U_c}{U_c}$$

As long as $\Delta U_c$ is smaller than $U_c$, the points $R_1$ and $R_{1a}$ are on one side of the vertical of the point R, and the points $Q_{1a}$ and $Q_1$ on the other side of the said vertical. Therefore, the amplifier B continues to operate under the same conditions when the voltage $U_c$ varies. This procedure may be adopted for as many control voltages $U_c$ as desired. It is important to note that no restrictive hypothesis has been made regarding the nature of the load impedances Y and Z of the utilisation circuits of the amplifiers A and B. Notably the load impedance Z may consist of the input impedance of a four terminal network or any equivalent device.

Finally, it will readily be appreciated that it is thus possible to control a whole chain of amplifiers such as B by means of a single amplifier such as A, provided only that the amplifiers $B_1, B_2 \ldots B_n$ bear the same ratio to A as does B, the utilisation winding of A feeding into the series polarising windings of the amplifiers $B_1, B_2 \ldots B_n$.

We claim:

1. A magnetic amplifier device having adapted compensation, wherein there are provided at least two magnetic amplifiers each having an output circuit, the first of which performs the function of a control amplifier, while the second is subject to the regulation of the first, a load connected in series with the output circuit of only the second magnetic amplifier, the first magnetic amplifier having its output circuit connected to effect an automatic biasing of the second magnetic amplifier, and wherein the output circuit of the control amplifier, through which circuit direct current flows, comprises in series, an inductance and a feedback winding wound on the magnetic circuit of said control amplifier, and a biasing winding wound on the magnetic circuit of the regulated amplifier connected to said feedback winding in the output circuit of said first magnetic amplifier.

2. A device as claimed in claim 1, wherein the magnetic amplifier subject to regulation is biased so as to supply its minimum current.

3. A device as claimed in claim 2, wherein an adjusting impedance is disposed in series with the biasing winding of the regulated amplifier.

4. A device as claimed in claim 3, wherein the control magnetic amplifier further comprises a biasing winding connected to a source of direct current and the magnetic amplifier subject to regulation further comprises a control winding, which control winding includes means for selectively energizing the same from said direct current source.

5. A device according to claim 4, wherein the magnetic circuits of the amplifiers are identical.

6. A device according to claim 5, wherein the magnetic amplifiers are arranged in the same thermostatically controlled chamber.

7. A device according to claim 6, wherein the first magnetic amplifier controls a plurality of second amplifiers, the biasing windings of the latter being connected in series in the output circuit of the first amplifier.

8. A device according to claim 7, wherein the same parameters determine the operation of all the amplifiers.

9. A magnetic amplifier device comprising a control magnetic amplifier and at least one magnetic amplifier subject to regulation, each magnetic amplifier including a saturable magnetic circuit, a main winding wound on said saturable magnetic circuit with each main winding having a respective rectifier connected in series therewith to a source of alternating current, a feedback winding wound on the saturable magnetic circuit of the control magnetic amplifier with an impedance connected in series therewith to the main winding and rectifier of the control magnetic amplifier, and a biasing winding wound on the saturable magnetic circuit of each magnetic amplifier subject to regulation and connected to the feedback winding of the control magnetic amplifier and fed by output current of the control magnetic amplifier to insure automatic biasing continuously regulating the respective magnetic amplifier subject to regulation, each magnetic amplifier subject to regulation having a separate load connected in series with the main winding and rectifier of only the respective magnetic amplifier subject to regulation.

References Cited in the file of this patent

UNITED STATES PATENTS

| | | |
|---|---|---|
| 2,561,329 | Ahlen | July 24, 1951 |
| 2,694,178 | Smith | Nov. 9, 1954 |
| 2,754,474 | Barhart | July 10, 1956 |
| 2,817,807 | Weir | Dec. 24, 1957 |